Aug. 23, 1938.  J. F. GODDARD  2,127,627

REPAIR CLAMP FOR DRESSER COUPLINGS

Original Filed March 9, 1937

Joseph F. Goddard
INVENTOR.

BY W. B. Harpman
ATTORNEY.

Patented Aug. 23, 1938

2,127,627

UNITED STATES PATENT OFFICE 2,127,627

REPAIR CLAMP FOR DRESSER COUPLINGS

Joseph F. Goddard, Canfield, Ohio

Application March 9, 1937, Serial No. 129,865
Renewed July 14, 1938

1 Claim. (Cl. 138—99)

This invention relates to repair clamps for Dresser couplings.

The principal object of this invention is to provide a simple yet efficient repair clamp adapted for use in patching holes in a Dresser coupling.

A further object of this invention is to provide a repair clamp for Dresser couplings that may be easily and quickly applied and positive in action.

A still further object of this invention is the provision of a repair clamp and Dresser coupling that may be efficiently used in repairing a hole in the center ring of a coupling, either between the bolts of the coupling or directly underneath one of the bolts in an ordinarily inaccessible position.

Dresser couplings are commonly used in connecting the various lengths of tubes in the construction of a gas line. In the event of a hole forming in a coupling, it becomes necessary to patch it while the line is in service as it is ordinarily impossible to shut off the gas and replace the entire coupling. It is therefore highly desirable that the repair clamp provide an adequate and permanent patch.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein—

Figure 1:
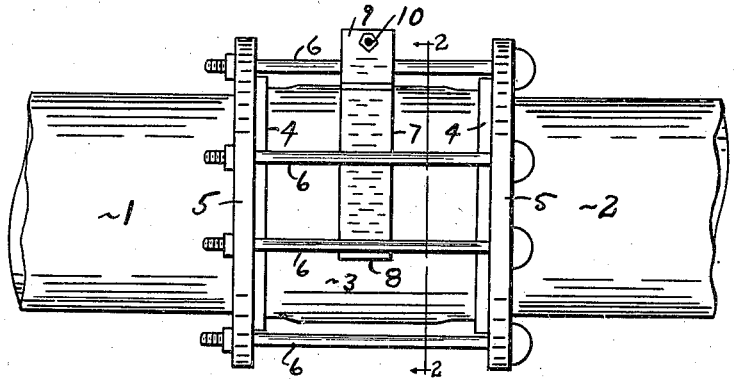
Figure 1 is a side elevation of a Dresser coupling in place on a pipe line, and shows a repair clamp in position thereon.

By referring to the drawing, and Figure 1 in particular, a Dresser coupling is shown positioned on the ends of pipes 1 and 2. The coupling comprises a center ring 3, a pair of rubber gaskets 4, and a pair of followers 5. A plurality of bolts 6 are shown holding the entire assembly together, and a repair clamp 7 is shown positioned partly in the space between the center ring 3 and the bolts 6, an end 8 of this repair clamp 7 being hooked around one of the bolts 6, and the opposite end 9 being bent upwardly and outwardly and provided with a U-bolt 10 designed to hook in under one of the bolts 6.

Figure 2:
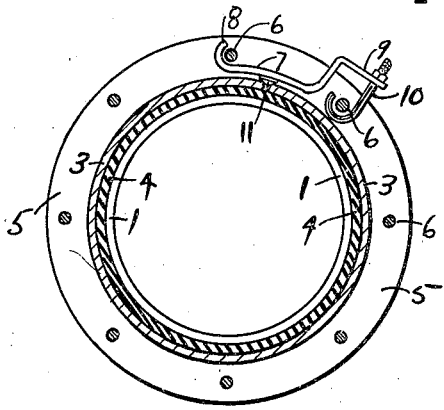
Figure 2 is a cross section taken on line 2—2 of Figure 1.
Figure 4:
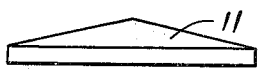
Figure 4 is a rubber button adapted to be forced into the hole being repaired.

By referring to the cross section shown in Figure 2 it will be seen that a rubber button 11 is positioned between the clamp 7 and the center ring 3, thus effectively plugging a hole in the center ring 3. The clamp shown in Figure 2 is adapted to be hooked around a bolt 6 and pass in under another bolt 6, and to be clamped to a third one of the bolts 6, thus allowing for the repair of a hole directly underneath one of the bolts 6 which is a rather inaccessible position.

Figure 3:
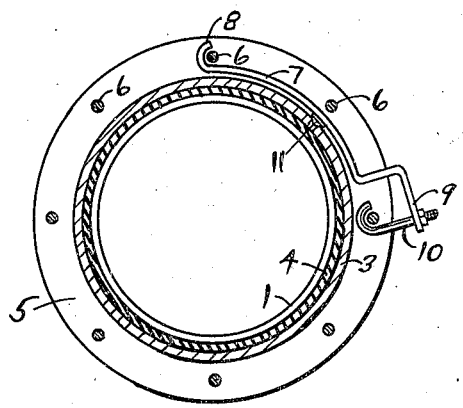
Figure 3 is a view similar to Figure 2, showing, however, a shorter repair clamp in position.

By referring to Figure 3 it will be seen that a shorter repair clamp is shown, it being hooked on one of the bolts 6 and bolted down on the next bolt. This clamp is adapted for the repair of a hole which is well out in the open between the bolts 6, and can also be used to advantage when the pipe line being repaired is in cramped quarters such as would be the case where a number of pipe lines are placed close together. It will be apparent that the clamp is simply designed so that it may be quickly installed. The repair provided by this clamp may be considered permanent in as much as the rubber button provides an adequate seal, and the clamp will hold it in position indefinitely.

What I claim is:

A repair clamp for Dresser couplings having a semi-U-shaped hook formed on one end adapted to be attached to one of the bolts of said Dresser coupling, the opposite end of said clamp being bent upwardly and outwardly, a U-bolt positioned in the outwardly extending portion adapted to engage one of said Dresser coupling bolts, a rubber button designed to be held between the clamp and a center ring of said coupling to effectively plug a hole in the center ring.

JOSEPH F. GODDARD.